United States Patent [19]

Kiser et al.

[11] Patent Number: 5,414,587
[45] Date of Patent: May 9, 1995

[54] SURGE SUPPRESSION DEVICE

[75] Inventors: Willie C. Kiser, Rio Rancho; Kevin G. Foreman, Sandia Park; Paul J. Miller, Albuquerque, all of N. Mex.

[73] Assignee: TRW Inc., Redondo Beach, Calif.

[21] Appl. No.: 998,333

[22] Filed: Dec. 30, 1992

Related U.S. Application Data

[63] Continuation-in-part of Ser. No. 938,111, Aug. 31, 1992, Pat. No. 5,290,191, which is a continuation-in-part of Ser. No. 895,148, Jun. 5, 1992, Pat. No. 5,181,859, which is a continuation of Ser. No. 694,262, Apr. 29, 1991, abandoned.

[51] Int. Cl.⁶ .............................................. H01R 13/02
[52] U.S. Cl. ................................... 361/118; 361/119; 361/127; 361/56
[58] Field of Search ............... 361/119, 118, 117, 127, 361/56, 91, 111; 428/901, 209

[56] References Cited

U.S. PATENT DOCUMENTS

| | | |
|---|---|---|
| 2,760,128 | 8/1956 | Colby . |
| 2,944,330 | 7/1960 | Swick . |
| 3,072,873 | 1/1963 | Traher .............................. 361/118 |
| 3,500,194 | 3/1970 | Smith . |
| 3,569,915 | 3/1971 | Langham et al. ................ 439/608 |
| 3,670,292 | 6/1972 | Tracy ................................ 439/608 |
| 3,736,379 | 5/1973 | Kagan ............................... 379/98 |
| 3,753,261 | 8/1973 | Thaxton ........................... 439/490 |
| 3,821,686 | 6/1974 | Harnden, Jr. ..................... 338/21 |
| 3,825,874 | 7/1974 | Peverill ............................. 439/579 |
| 3,852,700 | 12/1974 | Haws ................................ 439/98 |
| 3,905,013 | 9/1975 | Lee ................................... 439/366 |
| 4,002,397 | 1/1977 | Wang et al. ...................... 439/225 |
| 4,056,299 | 11/1977 | Paige ................................ 439/439 |
| 4,082,394 | 4/1978 | Gedney et al. .................... 439/69 |
| 4,326,765 | 4/1982 | Brancaleone ..................... 439/69 |
| 4,330,166 | 5/1982 | Cooper et al. ................. 339/143 R |
| 4,362,350 | 12/1982 | von Harz .......................... 439/608 |
| 4,407,552 | 10/1983 | Watanabe et al. ................ 439/620 |
| 4,415,218 | 11/1983 | McKenzie ........................ 439/620 |
| 4,440,463 | 4/1984 | Gliha, Jr. et al. ................ 439/92 |
| 4,522,455 | 6/1985 | Johnson ........................... 339/123 |
| 4,580,866 | 4/1986 | Hagner ........................ 339/147 R |
| 4,673,237 | 6/1987 | Wadsworth ..................... 439/607 |
| 4,676,564 | 6/1987 | Mitchell, Jr. ..................... 439/77 |
| 4,709,253 | 11/1987 | Walters ............................ 357/68 |
| 4,717,349 | 1/1988 | Johnson ........................... 439/92 |
| 4,726,638 | 2/1988 | Farrar et al. ..................... 439/620 |
| 4,729,743 | 3/1988 | Farrar et al. ..................... 439/276 |
| 4,729,752 | 3/1988 | Dawson, Jr. et al. ............ 439/620 |
| 4,813,891 | 3/1989 | Walters et al. ................... 439/620 |
| 4,820,174 | 4/1989 | Farrar et al. ..................... 439/95 |
| 4,846,705 | 7/1989 | Brunnenmeyer .................. 439/78 |
| 4,979,070 | 12/1990 | Bodkin ............................. 361/42 |
| 4,979,904 | 12/1990 | Francis ............................. 439/108 |

(List continued on next page.)

FOREIGN PATENT DOCUMENTS 0246305 1/1926 United Kingdom ........ H01R 13/02

OTHER PUBLICATIONS

U.S. Ser. No. 998,332, filed Dec. 30, 1992.
U.S. Ser. No. 998,354, filed Dec. 30, 1992.
Brinkman brand all-purpose surge suppressor, package literature and three pictures.
Pulse-Guard "Transient Overvoltage Protection", 1 pg, date believed to be mar. 1992. (Ex. C).

(List continued on next page.)

Primary Examiner—A. D. Pellinen
Assistant Examiner—S. Jackson
Attorney, Agent, or Firm—G. Gregory Schivley; R. W. Keller

[57] ABSTRACT

A surge suppression device which fits over the end of an electrical plug and permits normal mating of the plug with the female receptacle. In the preferred embodiment, the device includes a body of metal-oxide varistor (MOV) material where one pin is connected to one plate on the MOV and another plug pin is connected to an opposing plate on the MOV. The MOV breaks down when experiencing excessive voltage levels to shunt potentially damaging voltages between the plug pins thereby preventing the spikes from reaching the protected equipment.

28 Claims, 4 Drawing Sheets

U.S. PATENT DOCUMENTS

| | | | |
|---|---|---|---|
| 4,992,333 | 2/1991 | Hyatt | 428/402 |
| 5,092,788 | 3/1992 | Pristupa, Jr. et al. | 439/225 |
| 5,118,302 | 6/1992 | Fussell et al. | 439/225 |
| 5,134,252 | 7/1992 | Himeno et al. | 174/268 |
| 5,181,859 | 1/1993 | Foreman et al. | 439/225 |
| 5,183,698 | 2/1993 | Stephenson et al. | 428/209 |
| 5,290,191 | 3/1994 | Foreman et al. | 439/225 |

OTHER PUBLICATIONS

Hyatt, "A Technique for Optimizing ESD, EMP and Lightning Protection", pp. 393–408, date believed to be fall 1992. (Ex. B).

G&H Technology, Inc. "Pulse-Guard" literature including Sub-Millimeter model, 10 sheets, date believed to be Aug. 1992. (Ex. D).

Archer, "Heavy Duty Spike Protector". (Ex. A).

Originally filed application for U.S. Pat. No. 4,580,866 to Hagner.

Pulse-Guard "Pulse-Guard Model 'PGD' Submillimeter Suppressor Arrays", 2 sheets date believed to be Oct. 1992 (Ex. E).

Pulse-Guard "The Super ESD Suppressor For I/O Connectors", 4 sheets, date believed to be Feb. 1993 (Ex. F).

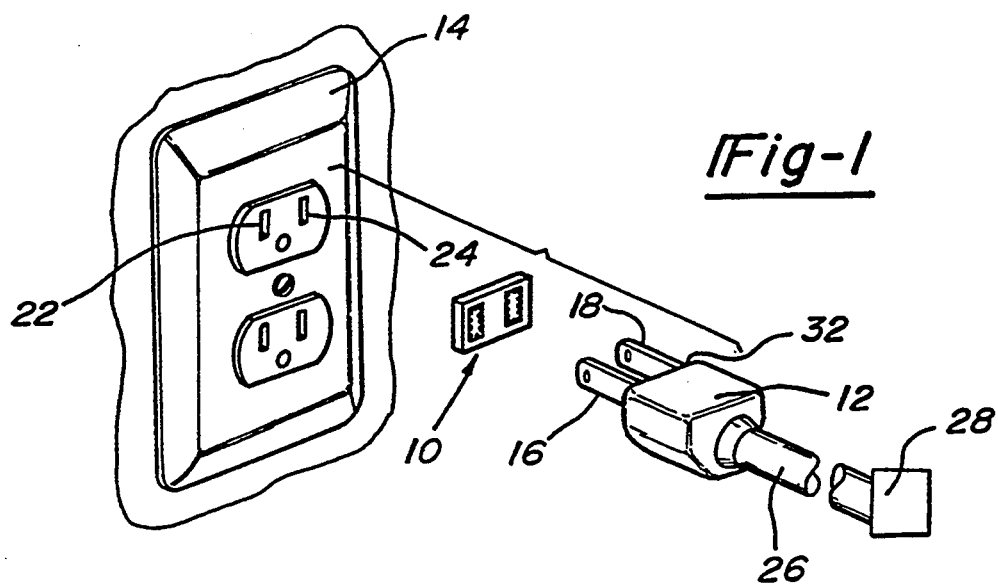
*Fig-1*
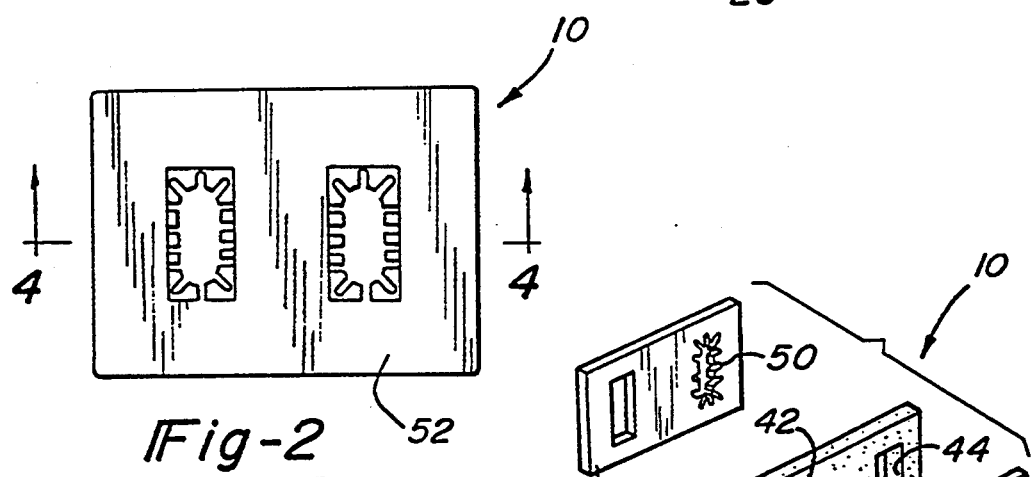
*Fig-2*
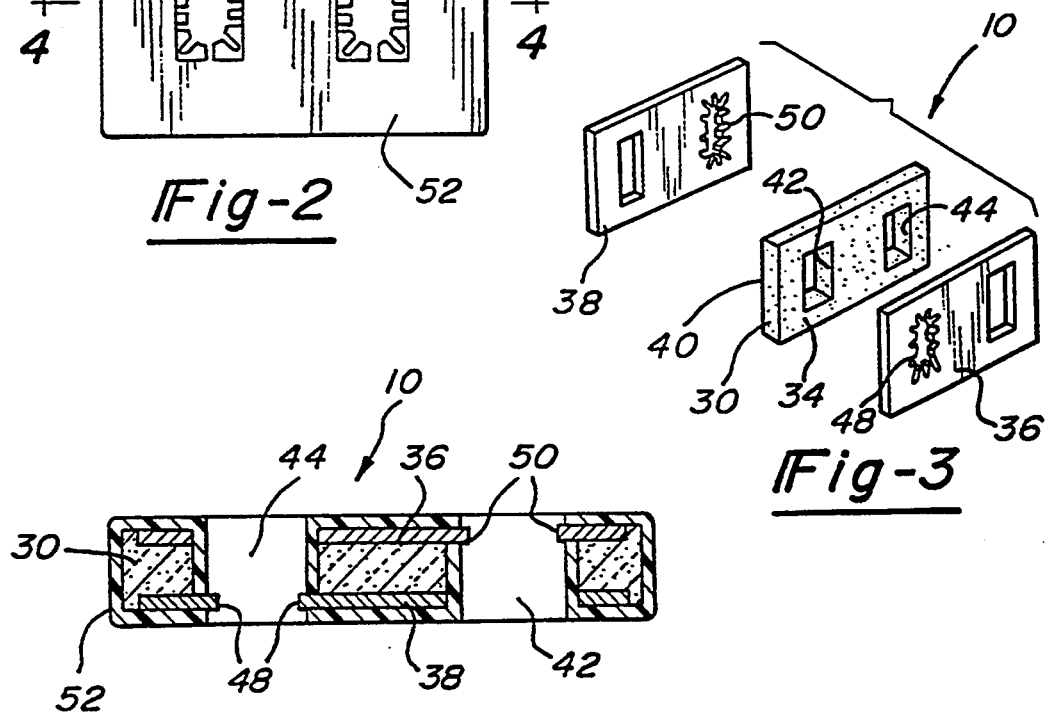
*Fig-3*
*Fig-4*

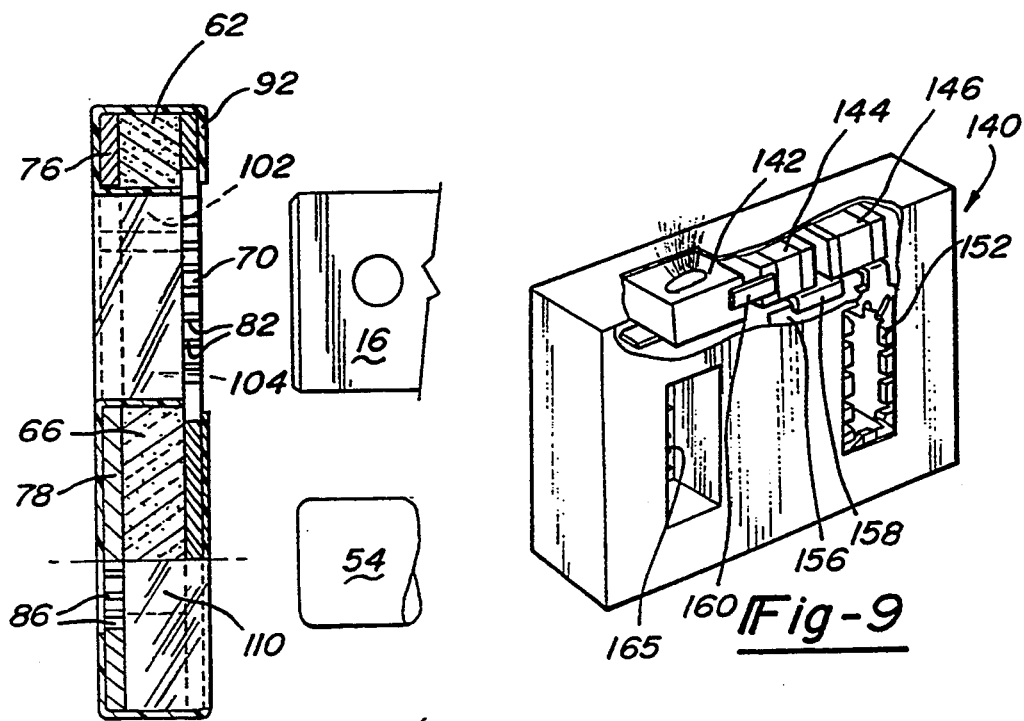
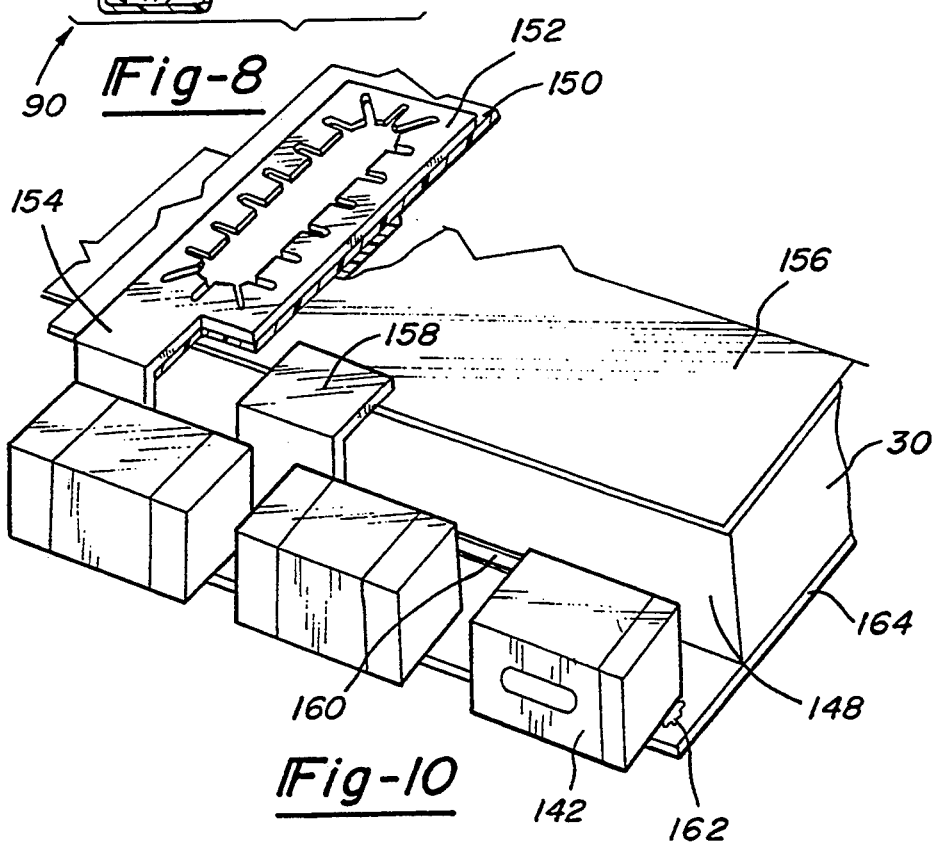

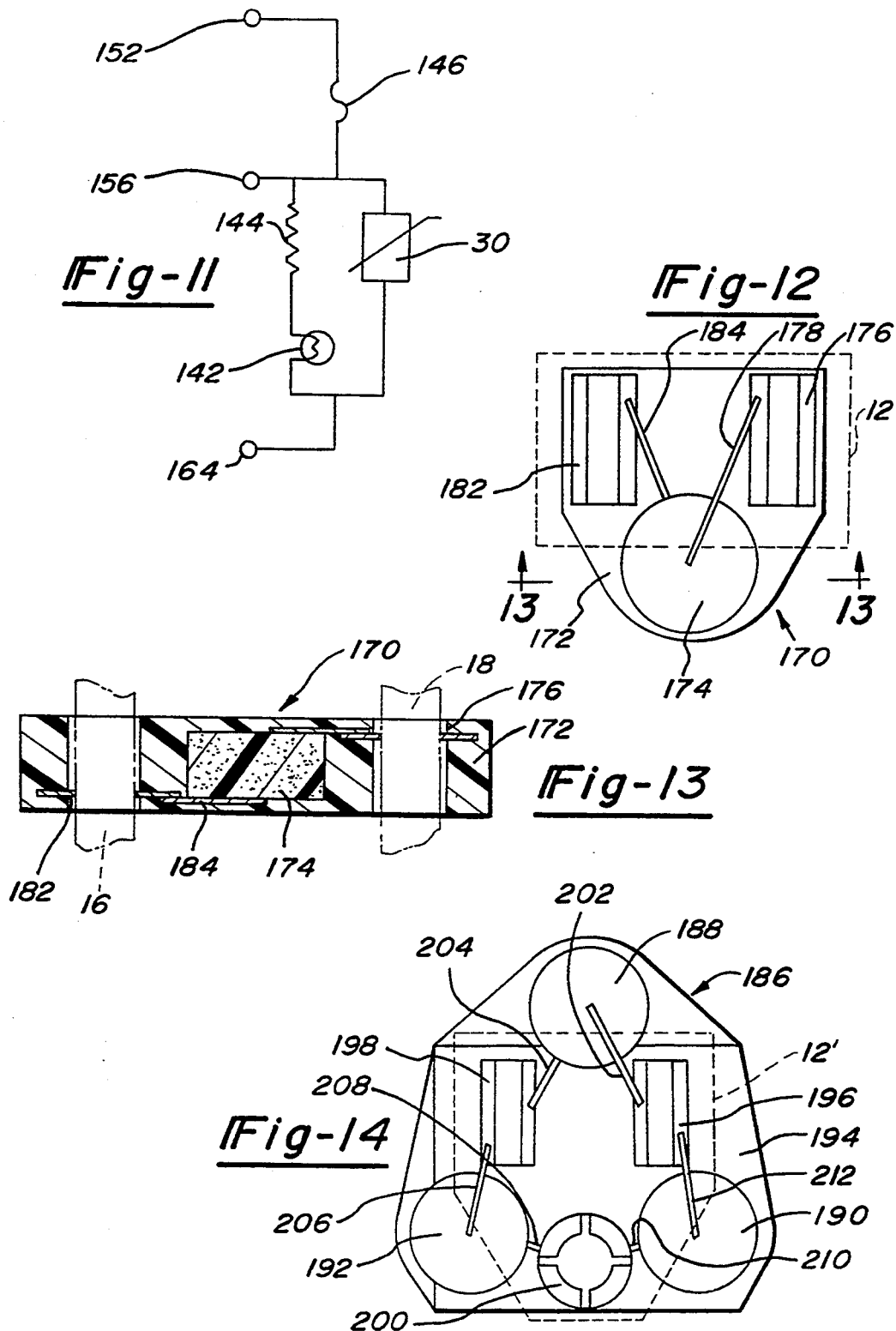

SURGE SUPPRESSION DEVICE

CROSS REFERENCE TO RELATED APPLICATIONS

This application is a continuation-in-part of U.S. Ser. No. 938,111, filed Aug. 31, 1992 now U.S. Pat. No. 5,290,191, which is a continuation-in-part of U.S. Ser. No. 895,148 filed Jun. 5, 1992, now U.S. Pat. No. 5,181,859, which is a continuation of U.S. Ser. No. 694,262 filed Apr. 29, 1991, now abandoned. This application is also related to U.S. Ser. No. 07/998,354, filed Dec. 30, 1992; U.S. Ser. No. 07/998,332, filed Dec. 30, 1992; U.S. Ser. No. 08/087,638, filed Jul. 1, 1993; U.S. Ser. No. 08/054,658, filed Apr. 23, 1993; and U.S. Ser. No. 08/139,594, filed Oct. 20, 1993.

BACKGROUND OF THE INVENTION

1. Technical Field

This invention relates to electrical surge suppressing techniques and, more particularly, to a device for reducing electrical power line noise and interference.

2. Discussion

Modern commercial electrical equipment can be damaged by noise, voltage spikes and electromagnetic interference (EMI) which is conducted through the power lines. Several of the present devices used for suppression of line noise include surge suppressor power strips, gang boxes and active power conditioners. Typically, existing devices for surge suppression are bulky and occupy considerable space around the electronic equipment. They also generally require an additional power plug, receptacle and an electrical enclosure to house the plug, the receptacle and the suppression circuitry. A commercially available example of this type of construction is the "Heavy-Duty Voltage Spike Protector" by Archer.

Other problems are found in the prior art designs which are due, in part, because they use individual wire leads up to several inches long. These additional wires contain a measurable and undesirable impedance which reduces the effectiveness of the suppression. In addition, the large enclosures and plug/receptacle hardware design utilized in prior art constructions also increase production and distribution costs, as well as imposing a space penalty on the end user.

A need therefore exists for an improved implementation concept for power plug surge suppressor that eliminates the extraneous hardware and improves the suppression performance.

SUMMARY OF THE INVENTION

In accordance with the teachings of the present invention, a device including voltage transient limiting material thereon is provided with a series of holes aligned with the pins in the associated electrical plug. The device can be slipped over the male pins and is thin enough to allow the plug to be mated with a female power receptacle in the normal fashion, without interference from the device. The device has contacts that make connection between selected pins in the power plug and the transient limiting material without requiring long wire lead lengths.

The installation requires no modification to the host hardware, can be accomplished very quickly and does not interfere with the mechanical or electrical integrity of the host connectors. The functionality of the surge suppression is contained within the confines of the device, unlike prior art approaches which require the bulk of the functionality to be placed in an external enclosure outside of the electrical plug. As a result, the present invention eliminates the extraneous parts and eliminates the extra lead lengths, thereby improving the suppression performance and avoiding the need for space outside of the mated plug and receptacle to perform its function. Production and distribution costs are relatively small due to the elimination of extraneous parts and a major reduction in size and weight.

BRIEF DESCRIPTION OF THE DRAWINGS

Still other advantages of the present invention will become apparent to those skilled in the art after a study of the specification and by reference to the drawings in which:

FIG. 1 is an exploded perspective view of a surge suppression device of this invention, an electrical plug and receptacle;

FIG. 2 is a plan view of one embodiment of the surge suppression device which provides surge protection between the hot and neutral prongs of an AC electrical plug;

FIG. 3 is an exploded view of the device of FIG. 2;

FIG. 4 is a cross sectional view taken along the lines 4—4 of FIG. 2;

FIG. 8 is a cross sectional view taken along the lines 8—8 of FIG. 7;

FIG. 9 is a perspective view of still another embodiment of the surge suppression device of this invention;

FIG. 10 is an enlarged partial perspective of certain components of the device of FIG. 9;

FIG. 11 is an electrical schematic diagram of the components in the device design of FIG. 9;

FIG. 12 is a plan view of still another embodiment;

FIG. 13 is a cross sectional view taken along the lines 13—13 of FIG. 12; and

FIG. 14 is a plan view of another embodiment, similar to the embodiment of FIG. 12, for use with three-pronged electrical plugs.

DESCRIPTION OF THE PREFERRED EMBODIMENTS

Figure 5:
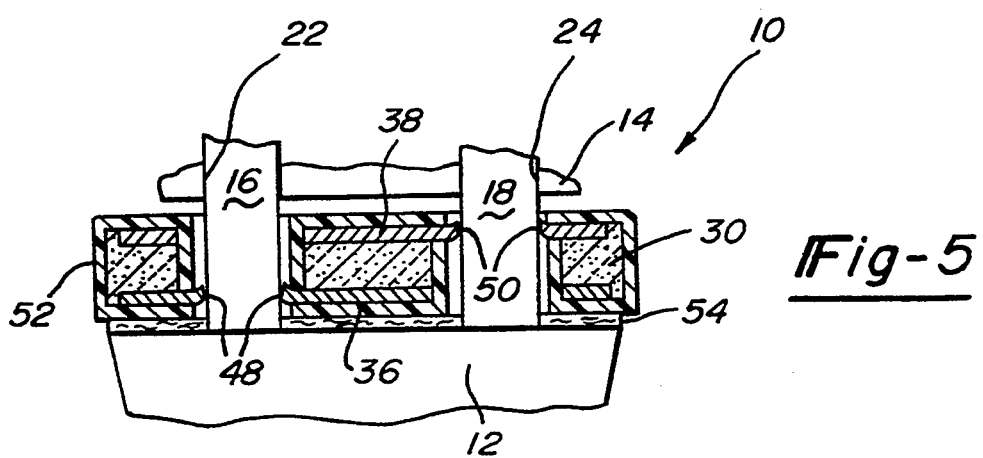
FIG. 5 is a view, similar to FIG. 4, showing the surge suppression device sandwiched between the electrical plug which is mated with the female receptacle.

It should be understood from the outset that the present invention will be described in connection with a few limited examples which illustrate the best mode of practicing the invention at the time that this application was filed. However, various modifications will become apparent to those skilled in the art after having the benefit of studying the text, drawings and claims which follow this detailed specification. Additional embodiments will also come to mind by reference to the aforementioned U.S. Ser. No. 938,111, which is hereby incorporated by reference.

FIGS. 1–5 illustrate one embodiment of the surge suppression device of this invention. FIG. 1 illustrates a surge suppression insert device 10 used in connection with a conventional two-pronged AC power plug 12 and 120 volt AC receptacle 14. Plug 12 can be used to supply power over cable 26 to equipment 28 which can be a large variety of government, industrial, commercial and residential electrical/electronic subsystems. For example, the device 10 can be quickly added in a power cable on a piece of factory equipment to non-intrusively eliminate noise on power lines caused by motors in the plant. Alternatively, the surge suppression device 10 can be added to power tools, portable electronics and computers without adding undue weight or bulk.

In FIG. 1, plug 12 includes conventional rectangular male pins 16 and 18, referred to as the hot and neutral conductive pins. Male pins 16, 18 typically are about 0.7 inches long and are normally respectively inserted directly into mating female sockets 22, 24 in receptacle 14. When directly mated, the power from receptacle 14 often has noise or voltage transients associated with it. As is known, normal line voltage is approximately 115–120 volts AC. Voltage transients of much higher voltage levels, known as surges, are often experienced and, if not suppressed, can damage the equipment 28 powered by plug 12. In accordance with the present invention, device 10 serves to suppress these voltage transients.

The construction details for device 10 are better shown in FIGS. 2–5. Substantially the entire body of the device is made of a voltage transient limiting material 30 which is a composition or combination of materials which operate to prevent excessive voltages from damaging the electrical device 28 connected to the plug 12. Presently preferred materials are ones having dielectric characteristics and include metal oxide dielectric materials, such as zinc oxide, which is designed so that it has a breakdown voltage that is above normal line voltage (e.g., 120 volts) yet low enough that the protection is experienced at high voltage transients. For example, surge suppressors formed from zinc oxide dielectric materials can have a breakdown voltage of approximately ±400 volts. Devices of this general type are known as metal oxide varistors (MOV's) and are commercially available from various sources such as Harris Semiconductor as model No. V131CA32. MOV body 30, in this embodiment, is formed in the shape of a thin planar wafer whose perimeter is preferably coextensive with or smaller than the periphery of the plug end face 32.

A major face 34 of the MOV body 30 has a conductive plate 36 thereon. Similarly, a conductive plate 38 is formed on an opposite face 40 of the body 30. Openings 42, 44 are formed in the body 30 to receive the hot and neutral pins 16, 18, respectively of plug 12.

Provision is made for making electrical contact between the pins 16 and 18 and the plates 36 and 38, respectively, when the device 10 is in use. In the illustrated embodiment, an array of bendable finger contacts 48 are formed from conductive plate 36 and protrude into opening 42. Similarly, contacts 50 extend into opening 44 to make electrical contact to plate 38. The plates 36, 38 and contacts 48, 50 can be formed from a conductive pattern of brass approximately 5 mils thick which is bonded to body 30 by solder or the like.

The exterior of body 30 is covered with a suitable insulating layer 52 such as Kapton while leaving contacts 48 and 50 exposed.

As shown best in FIG. 5, the device 10 is sufficiently thin that the plug 12 can be mated with the receptacle 14 in the normal fashion, with the device 10 being sandwiched therebetween. Typically, the total thickness of device 10 should be less than about 0.1 inch or less than about 15% of the length of pins 16, 18. The MOV body 30 itself is about 0.04 to 0.07 inch thick.

In use, the user slips the device 10 over the male pins of the plug 12. An optional adhesive layer 54 may be provided to adhere the device 10 to the end face 32 of plug 12. Pin 18 is thus connected to plate 36 by way of contacts 48. Similarly, plug pin 16 is connected to plate 38 by contacts 50. It will be appreciated that the pins 16 and 18 are thereby electrically coupled together through the dielectric body 30 via the overlapping plates 36, 38. The plug 12 is then inserted into the receptacle 14 in the normal fashion, with the device 10 being sandwiched therebetween.

When normal line voltage is being provided by receptacle 14, the MOV body 30 presents a very high impedance between pins 16 and 18. There is effectively an open circuit between pins 16 and 18 and, as a result, the voltage from receptacle 14 passes to equipment 28 substantially unaltered. However, if a voltage surge is experienced which exceeds the breakdown voltage of the MOV body 30 (e.g., above 400 volts) the MOV breaks down and provides a conductive path between pins 16 and 18. Thus, there is effectively a short circuit provided between pins 16 and 18 which shunts the potentially dangerous voltage levels from the device 28. This conductive path disappears when the line voltage returns to normal levels (e.g., below the breakdown voltage of body 30).

Figure 6:
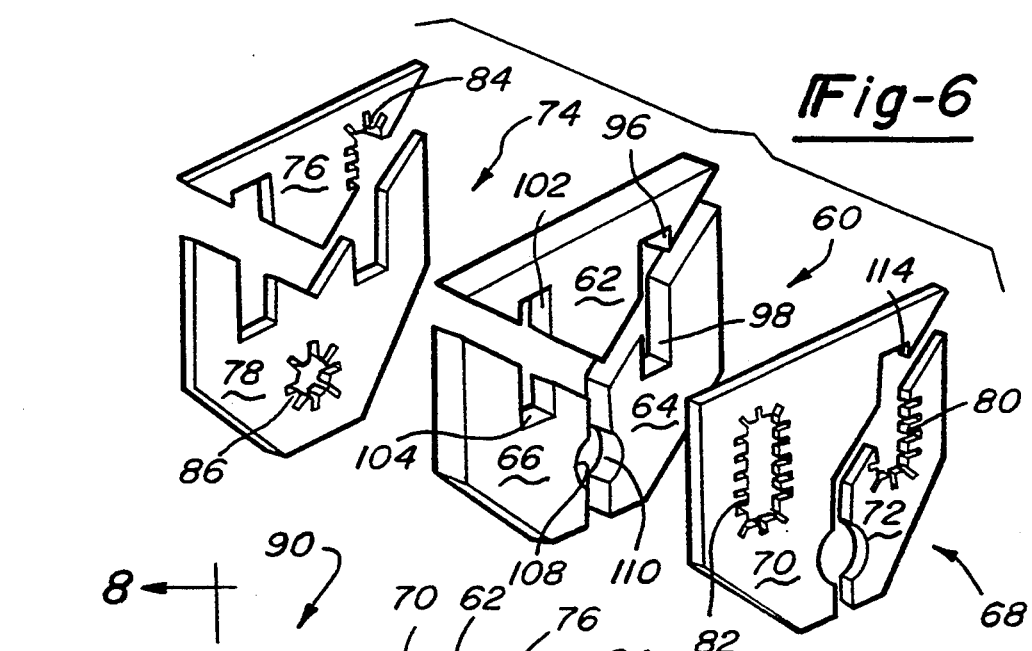
FIG. 6 is an exploded perspective view of another embodiment of this invention, for use with a three-pronged electrical plug.
Figure 7:
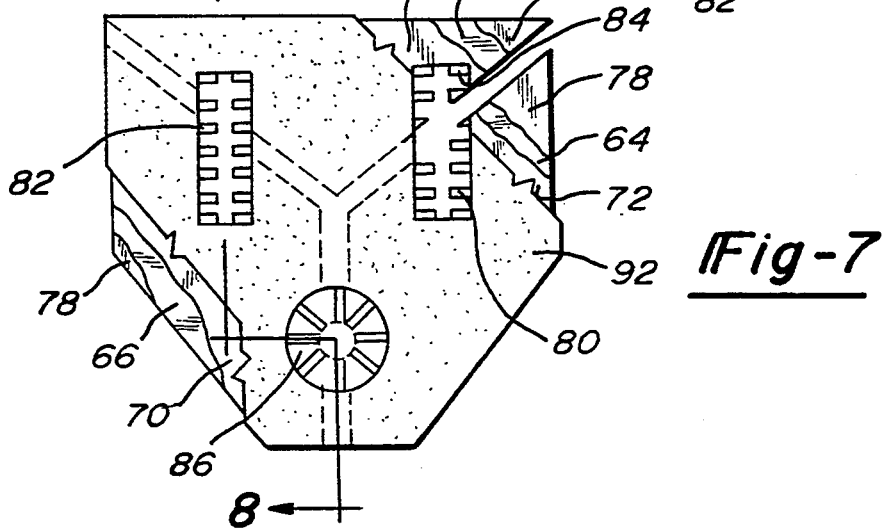
FIG. 7 is a plan view of the surge suppression device embodiment of FIG. 6.

The embodiment of FIGS. 2–5 provides protection from a differential voltage surge which appears between the hot and neutral pins 16 and 18. In contrast, the embodiment of FIGS. 6–8 provide a common-mode protection for a three-pronged electrical plug which includes a ground male pin 56 in addition to the previously discussed hot and neutral pins 16 and 18. In such manner the electrical equipment 28 is protected from voltage surges between any combination of the pins, i.e., between the ground pin 54 and the hot pin 16, between the ground pin 54 and the neutral pin 18, as well as between the hot and neutral pins 16 and 18.

In this later embodiment, the body 60 of metal oxide varistor material is split into three spaced, co-planar parts 62, 64 and 66. The top conductive plate 68 is split into two parts 70 and 72. The bottom conductive plate 74 is separated into two parts 76 and 78. Part 72 includes a split contact 80 for making electrical connection to the lower part of the neutral pin 18. Part 70 includes a full contact portion 82 for making contact with the entirety of the hot pin 16. Part 76, on the other hand, has a split contact portion 84 for making electrical contact to the upper portion of neutral pin 18. Part 78 of lower plate 74 includes a full contact area 86 for engaging the ground pin 54.

As shown most clearly in FIGS. 6, 7 and 8, there is a spacing between parts 62, 64 and 66 of MOV body 60 when the device 90 is assembled together. Likewise, parts 70 and 72 of plate 68 are spaced from each other. Analogously, parts 76 and 78 of plate 74 are spaced apart. As in the previous embodiment, the exterior of the device 90 is covered with an insulated coating 92. When assembled, cutouts 96 and 98 in body 60 cooperate to form a slot through which the neutral pin 18 passes. Cutouts 100 and 102 similarly form a slot 104 through which the hot pin 16 passes. Opposing arcuate recesses 108 and 110 cooperate to form an opening 112 through which the ground pin 54 passes.

Upper plate 68 further includes a cutout 114 which cooperates with contact 80 to form an opening through which the neutral pin 18 passes. Cutout 114 is large enough so that the pin 18 does not make electrical contact to conductive part 70. Instead, pin 18 only makes contact with the fingers 80 of part 72. On the other hand, bendable finger contact area 82 makes full contact with the hot pin 16. Likewise, bendable finger contacts 86 make electrical connection to the ground pin 54.

When the device 90 is sandwiched between the mated plug and receptacle, the multi-parted components of the device cooperate to provide the common-mode protection. Protection from ground to hot transients is provided by way of MOV part 66 which is sandwiched between conductive part 70 via contacts 82 and conductive part 78 via contact area 86. Ground to neutral transient protection is provided by way of MOV body part 64 which is sandwiched between conductive portion 72 via split contact area 80 and conductive part 78 which is electrically connected to ground pin 54 via contacts 86. Hot to neutral transient protection is provided by way of body part 62 which is sandwiched between conductive part 70 (via contact 82) and the half contact 84 on conductive part 76. In such manner, there are three separate MOV circuit paths for respectively protecting against voltage transients appearing as any combination of the male pins of the plug.

The embodiment of FIGS. 9 to 11 include the provision of a visual indicator which will inform the user about the operational status of the surge suppression device 140. This feature of the invention will be described in connection of a two-pronged embodiment similar to that illustrated in FIGS. 1–5. Consequently, like reference numerals will be used in the description thereof. However, it should be understood that this feature has applicability to all embodiments.

In FIGS. 9 to 11, a status indicator light 142, a discrete resistor 144 and fuse 146 are provided in a pocket 148 in an upper edge of the device. An insulating layer 150 isolates the hot pin contact 152 and connecting trace 154 from the hot metal layer forming plate 156 on the MOV body 30. L-shaped trace 154 extends from contact 152 into the pocket 148 to make connection with one end of fuse component 146. An opposite end of fuse 146 is connected by way of L-shaped trace 158 to the hot metal plate 156. Trace 158 also makes electrical contact to one end of resistor 144 which, in turn, is connected by way of trace 160 to one end of indicator light 142. An opposite end of light 142 is electrically connected by way of a solder joint or the like 162 to the neutral metal plate 164 which, in turn, is coupled to neutral pin contact 165.

It should now be appreciated that the connection thus described forms the electrical schematic shown in FIG. 11. Fuse 146 is calibrated to burn out at a level well below the maximum current rating of the MOV body 30, for example, at 10 amperes. If the device 140 is subjected to an abnormally high current, the fuse 146 will blow thereby removing power from the light 142. Thus, the user will be provided with a visual indication that the device 140 is no longer functional.

The embodiments of FIGS. 12–14 illustrate designs using discrete components, as compared to the monolithic approach shown in the previous figures. Functionally, the embodiment of FIGS. 12–13 are equivalent to the embodiment of FIGS. 1–5. Similarly, the embodiment of FIG. 14 is functionally equivalent to that of the embodiment of FIGS. 6–8.

The device 170 in FIGS. 12–13 include a plastic housing 172 incorporating a discrete MOV disk 174. Neutral contacts 176 are provided for making electrical connection to the neutral plug pin 18. Contacts 176 are connected to an upper face of MOV disk 174 by way of trace 178. Contact 182 for hot plug pin 16 is connected by way of trace 184 to an opposite surface of MOV disk 174. The geometric relationship between surge suppression device 170 and a two-pronged plug 12 is illustrated in FIG. 12.

A surge suppression device 186, incorporating both differential and common-mode protection, is illustrated in FIG. 14. It includes three separated MOV disks 188, 190 and 192 contained in plastic housing 194. Contacts 196, 198 and 200 are provided for making electrical connection to the neutral, hot and ground plug pins. Trace 202 makes electrical connection between neutral contact 196 and one face of MOV 188. Trace 204 makes electrical connection between an opposite face of MOV 188 and hot contact 198. Trace 206 makes electrical connection between one surface of MOV 192 and hot contact 198. Trace 208 makes electrical connection between an opposite face of MOV 192 and ground plug contact 200. Trace 210 makes electrical connection between ground contact 200 and one face of MOV 190. Trace 194 makes electrical connection between an opposite face of MOV 190 and neutral contact 196. The geometric relationship between device 186 and a three-pronged plug 12' is illustrated in FIG. 14.

Those skilled in the art can now appreciate the present invention offers significant advantages over surge suppressor devices of the prior art. It can be quickly and easily installed. It eliminates extraneous and bulky parts resulting in a major reduction in size and weight. From an aesthetic point of view, the surge suppression function is accomplished less obtrusively than many existing alternatives, because its functionality is contained within a device which resides largely within the confines of the periphery of the plug. In addition, the present design eliminates extraneous wire lead lengths thus improving performance.

As noted from the outset, the invention has been described in connection with a few particular examples. However, various modifications and other applications will become apparent to the skilled practitioner after having the benefit of studying the specification, drawings and following claims.

What is claimed is:

1. A surge suppression device for protecting electrical equipment from damage, the electrical equipment being supplied with power from a plug having a plurality of male pins which mate with sockets in a female electrical receptacle, said device comprising:
   a structure sufficiently thin so as to fit between adjacent faces of the plug and female receptacle while permitting the pins to mate with the sockets;
   said structure having holes therein aligned with the pins in the plug, the structure being insertable over the pins so that the pins extend through the holes;
   first contact means for making electrical contact with one of the pins as it extends through a hole in the structure;
   second contact means for making electrical contact with a second pin as it extends through a second hole in the structure;

said structure including a body made of voltage transient limiting material having opposing first and second faces;

said first contact means being electrically connected to the first face;

said second contact means being electrically connected to the second face; and whereby the device is insertable over the pins of the male plug and the body provides surge suppression protection for the electrical equipment when the plug is mated with the female receptacle.

2. The device of claim 1 wherein the body is made of a metal oxide varistor material.

3. The device of claim 2 wherein the material is zinc oxide.

4. The device of claim 1 which further comprises a first plate on the first face of the body and a second plate on the second face of the body.

5. The device of claim 4 wherein the first and second plates are substantially coextensive with the first and second faces of the body.

6. The device of claim 5 wherein at least one hole passes through the body and at least one plate.

7. The device of claim 6 wherein the faces of the body are coated with an insulating material.

8. The device of claim 1 wherein the device lies essentially flush with the adjacent face of the plug.

9. The device of claim 1 which further comprises:
adhesive means for adhesively securing a surface of the device against an end face of the plug.

10. The device of claim 1 wherein the structure comprises a planar wafer of voltage transient limiting material which substantially corresponds to the shape of the perimeter of the end plug and has a thickness which is less than about 15% of the length of the pins of the plug.

11. The device of claim 1 wherein said contact means comprises a plurality of bendable fingers.

12. The device of claim 1 which further includes visual means for indicating that the device is operational.

13. The device of claim 12 wherein the visual means includes a fuse and a lamp connected between one of the contact means and to one face of the body.

14. The device of claim 1 wherein the first and second contact means comprise a plurality of bendable fingers extending into the holes for making wiping contact with the pins.

15. The device of claim 1 for use with a three-pronged plug having neutral, hot and ground pins, said device further comprising:
a plurality of spaced bodies of metal oxide varistors (MOV);
a plurality of spaced plates on opposing faces of the plurality of MOV bodies; and
connection means for providing common-mode protection from voltage transients appearing between any combination of the pins.

16. The device of claim 15 wherein the connection means include a split contact arrangement where the same pin is electrically connected to one plate on one face of an MOV body and to another plate on an opposite face of another MOV body.

17. A surge suppression device for protecting electrical equipment from damage, the electrical equipment being supplied with power from a plug having a plurality of male pins which mate with sockets in a female electrical receptacle, said device comprising:

a planar body of metal oxide varistor (MOV) material, said body having first and second opposing major faces, said body having a plurality of holes therein aligned with the pins in the plug;

first contact means on the first face of the MOV body for making electrical contact with one of the pins as it extends through a hole in the body;

second contact means on the second face of the MOV body for making electrical contact with a second pin as it extends through a second hole in the body;

a first metallic plate on the first face of the MOV body electrically connected to the first contact means;

a second plate on the second face of the MOV body electrically connected to the second contact means; and said device being removably insertable over the pins of the male plug with the pins extending through the holes in the device, said device being sufficiently thin to fit between the plug and female receptacle while permitting the pins to mate with the sockets, whereby the device provides surge suppression protection for the electrical equipment when the plug is mated with the female receptacle.

18. The device of claim 17 wherein the device lies essentially flush with an end face of the plug and has a perimeter essentially coextensive with the perimeter of the plug.

19. The device of claim 17 which further comprises:
indicator means for providing information about the operational status of the device.

20. The device of claim 19 wherein said indicator means comprises a fuse and an indicator lamp which lights during proper operation of the device, with the fuse being blown to extinguish the lamp when the device is subject to abnormal current levels.

21. The device of claim 20 wherein the fuse and the light are electrically connected between the first and second contact means.

22. A surge suppression device for protecting electrical equipment from damage, the electrical equipment being supplied with power from a plug having a plurality of male pins which mate with sockets in the female electrical receptacle, said device comprising:

a non-conductive, generally planar housing that is sufficiently thin so as to fit between the plug and the female receptacle while permitting mating engagement therebetween, said housing having holes therein aligned with the pins in the plug, with the housing being removably insertable over the pins so that the pins extend through the holes;

at least one body of voltage transient limiting material within the housing;

first contact means for making electrical contact with one of the pins as it extends through a hole in the housing and one face of the body of voltage transient limiting material;

second contact means for making electrical contact between a second pin as it extends through a second hole in the housing and an opposite face of the body Of voltage transient limiting material; and wherein the housing is removably insertable over the pins of the male plug and the body of voltage transient limiting material provides surge suppression protection for the electrical equipment when the plug is mated with the female receptacle.

23. The device of claim 22 which further provides differential and common-mode surge suppression for the electrical equipment, said device further comprising:

first, second and third separated disks of metal oxide varistor (MOV) material contained within the housing;

three holes in the housing through which hot, neutral and ground pins of the plug extend;

neutral contact means for making electrical contact with the neutral pin as it extends through a hole;

hot contact means for making electrical contact with the hot pin as it extends through a second hole;

ground contact means for making electrical contact to the ground pin as it extends through a third hole;

first conductive means for making electrical connection between the neutral contact means and one face of a first MOV disk;

second conductive means for making electrical connection between an opposite face of the first MOV disk and the hot contact means;

third conductive means for making electrical connection between the hot contact means and one face of the second disk;

fourth conductive means for making electrical connection between an opposite face of the second MOV disk and the ground contact means;

fifth conductive means for making electrical connection between the ground contact means and one face of the third MOV disk; and sixth conductive means for making electrical contact between an opposite face of the third MOV disk and the neutral contact means.

24. A surge suppression device for protecting electrical equipment from differential and common-mode voltage transients appearing between any combination of hot, neutral and ground pins of a plug which mate with sockets in a female receptacle, said device comprising:

first, second and third spaced bodies of metal oxide varistor (MOV) material;

first and second insulating layers on opposite faces of the first, second and third bodies for maintaining the bodies adjacent to each other in a spaced coplanar relationship;

said bodies having a plurality of holes therethrough for receiving the neutral, hot and ground pins of the plug;

neutral contact means for making electrical contact with the neutral pin as it extends through a hole;

hot contact means for making electrical contact with the hot pin as it extends through a second hole;

ground contact means for making electrical contact to the ground pin as it extends through a third hole;

first conductive means for making electrical connection between the neutral contact means and one face of the first MOV body;

second conductive means for making electrical connection between an opposite face of the first MOV body and the hot contact means;

third conductive means for making electrical connection between the hot contact means and one face of the second MOV;

fourth conductive means for making electrical connection between an opposite face of the second MOV and the ground contact means;

fifth conductive means for making electrical connection between the ground contact means and one face of the third MOV;

sixth conductive means for making electrical contact between an opposite face of the third MOV and the neutral contact means; and said device being sufficiently thin so as to fit between the plug and the female receptacle while permitting mating engagement therebetween to thereby provide differential and common-mode surge suppression protection for electrical equipment being powered by the receptacle when the plug is mated therewith.

25. The device of claim 24 which further comprises:

first and second metallic plates on one side of the MOV bodies, the first plate having a split contact for engaging a lower portion of the neutral plug pin, said first plate lying on the first MOV body, said second plate bridging the second and third MOV bodies, said second plate including a contact for making electrical connection to the hot plug pin;

second and third conductive plates on an opposite side of the MOV bodies, said third plate lying on the second MOV and having a split contact for making electrical connection with an upper portion of the neutral plug pin, the fourth plate bridging the second and third MOV bodies, and said fourth plate including a contact for making electrical connection with the ground plug pin.

26. A method of preventing damage to electrical equipment from voltage transients, said electrical equipment being supplied with power from a plug having a plurality of male pins which mate with sockets in a female receptacle, said method comprising:

providing a device having a series of holes therein corresponding to the pins in the male plug, said device having a body made of voltage transient limiting material connected between first and second conductive members;

inserting the device onto an end face of the plug so that the pins extend through the holes with one pin being electrically connected to one conductive member and another pin being connected to the second conductive member;

inserting the male plug pins into the female receptacle sockets, with the device lying therebetween; and using the characteristics of the body material to selectively shunt excessive voltage levels between the pins to thereby prevent damage to the electrical equipment.

27. The method of claim 26 wherein the material is a metal oxide varistor disk, and the conductive members comprise plates on opposite faces of the disk.

28. The method of claim 26 wherein the perimeter of the device lies essentially within the confines of the perimeter of an end face of the plug.

* * * * *